United States Patent [19]

Fauchier, II

[11] 4,236,818

[45] Dec. 2, 1980

[54] EXPOSURE TIME CONTROL FOR PHOTOGRAPHIC PRINTER

[75] Inventor: Jess F. Fauchier, II, Minneapolis, Minn.

[73] Assignee: Pako Corporation, Minneapolis, Minn.

[21] Appl. No.: 74,399

[22] Filed: Sep. 7, 1979

[51] Int. Cl.³ ............................................. G03B 27/73
[52] U.S. Cl. ....................................... 355/77; 355/38; 355/68
[58] Field of Search ................................... 355/35–38, 355/67–71, 83, 88, 77

[56] References Cited

U.S. PATENT DOCUMENTS

| 3,888,580 | 6/1975 | Amano et al. | 355/38 |
| 4,099,862 | 7/1978 | Bickl et al. | 355/38 X |
| 4,154,523 | 5/1979 | Rising et al. | 355/38 |
| 4,168,121 | 9/1979 | Freier et al. | 355/38 |

Primary Examiner—L. T. Hix
Assistant Examiner—W. J. Brady
Attorney, Agent, or Firm—Kinney, Lange, Braddock, Westman and Fairbairn

[57] ABSTRACT

A photographic printer includes large area transmission density (LATD) sensors and a digital processor, such as a microprocessor, which calculates red, green and blue exposure times based upon the LATD sensor values. Prior to an exposure cycle, the LATD sensors are initialized, and LATD sensor readings are taken. From these initial sensor readings red, green, and blue initial exposure times are calculated, and an exposure cycle is initiated based upon these initial exposure times. During the exposure cycle, additional sensor readings continue to be taken on an asynchronous basis, and red, green, and blue exposure times are recalculated each time a reading is taken. The exposure times used during the exposure cycle are continuously modified and updated as a function of the recalculated exposure times. A running average of the sensor readings is maintained, and the modified exposure times are based upon a weighted average of the most recent sensor reading and the running average. In addition, individual bad readings are sorted out and are not included in the running average. The occurrence of greater than a predetermined number of bad readings or data points causes termination of the exposure.

18 Claims, 4 Drawing Figures

EXPOSURE TIME CONTROL FOR PHOTOGRAPHIC PRINTER

REFERENCE TO CO-PENDING APPLICATION

Reference is made to a co-pending application by G. Beckman entitled "Photosensor Circuit for Photographic Printer" which was filed on even date with this application and is assigned to the same assignee.

BACKGROUND OF THE INVENTION

1. Field of the Invention

The present invention relates to photographic printers. In particular, the present invention is an improved method and apparatus for controlling exposure times based upon large area transmission density sensor readings.

2. Description of the Prior Art

Photographic printers produce photographic prints from photographic film originals (generally negatives) by passing high intensity light through the film to expose the photographic emulsion layers of a photosensitive medium. The emulsion layers are subsequently processed to produce a print of the scene contained in the original.

In order to increase efficiency and minimize time required to fill customer orders, high speed printers have been developed in which many exposures are made in edge-to-edge relationship on a single roll of print paper. After the exposures are made, the roll is removed from the printer, is photoprocessed to produce prints, and is cut into individual prints. The prints are then sorted by customer order and ultimately packaged and sent to the customer.

A critical portion of a photographic printer is the exposure time control, which controls the duration of the exposure of the photosensitive medium. The exposure time control may utilize inputs from several different sources in order to determine the proper duration of the exposure. For example, most automatic printers use large area transmission density (LATD) sensors to sample the light transmitted by the negative either prior to or during the exposure. In addition, many automatic printers include an automatic density correction (ADC) or color scanning station which scans the negative prior to printing and corrects the exposure time in the event of an abnormality in illumination of the negative known as "subject failure". The operator may also enter density or color correction signals from the operator control panel. Based upon some or all of these input signals, the exposure time control determines the proper exposure time for each of the color channels based upon predetermined exposure time relationships.

In general, most printers which use LATD sensors are a single sensor reading for each color to determine the exposure times during a particular exposure cycle. In many analog and some digital controlled automatic printers, the LATD sensor readings are taken during the exposure cycle itself. In other digital controlled photographic printers, the LATD sensor readings are taken prior to the commencement of the exposure cycle, and the exposure times for all three color channels are calculated based upon the sensor values, automatic density correction signals (if any), operator entered correction signals, and other stored data prior to initiation of the exposure cycle. In both types of systems, the accuracy of the exposure times is a function of the accuracy of the LATD sensor readings.

SUMMARY OF THE INVENTION

The present invention is an improved method for controlling exposure times in a photographic printer based upon large area transmission density (LATD) sensor readings. With the method of the present invention, LATD sensor readings are made prior to initiation of an exposure cycle and initial exposure times are calculated based upon these readings. An exposure cycle is then initiated utilizing these initial exposure times. During the exposure cycle, additional LATD sensor readings are made, and exposure times are modified as a function of the LATD sensor readings made during the exposure cycle.

In the present invention a running average of sensor readings is preferably maintained, and modified exposure times are based upon a weighted average of the most recent sensor reading and the running average. In addition, individual bad readings (i.e readings which fall outside a predetermined range) are preferably sorted and not included in the running average. If a predetermined number of consecutive LATD sensor readings in one color channel fall outside the predetermined range, exposure is terminated. Similarly, if a predetermined number of total sensor readings fall outside the predetermined range, the exposure cycle is terminated.

DETAILED DESCRIPTION OF THE PREFERRED EMBODIMENT

Figure 1:
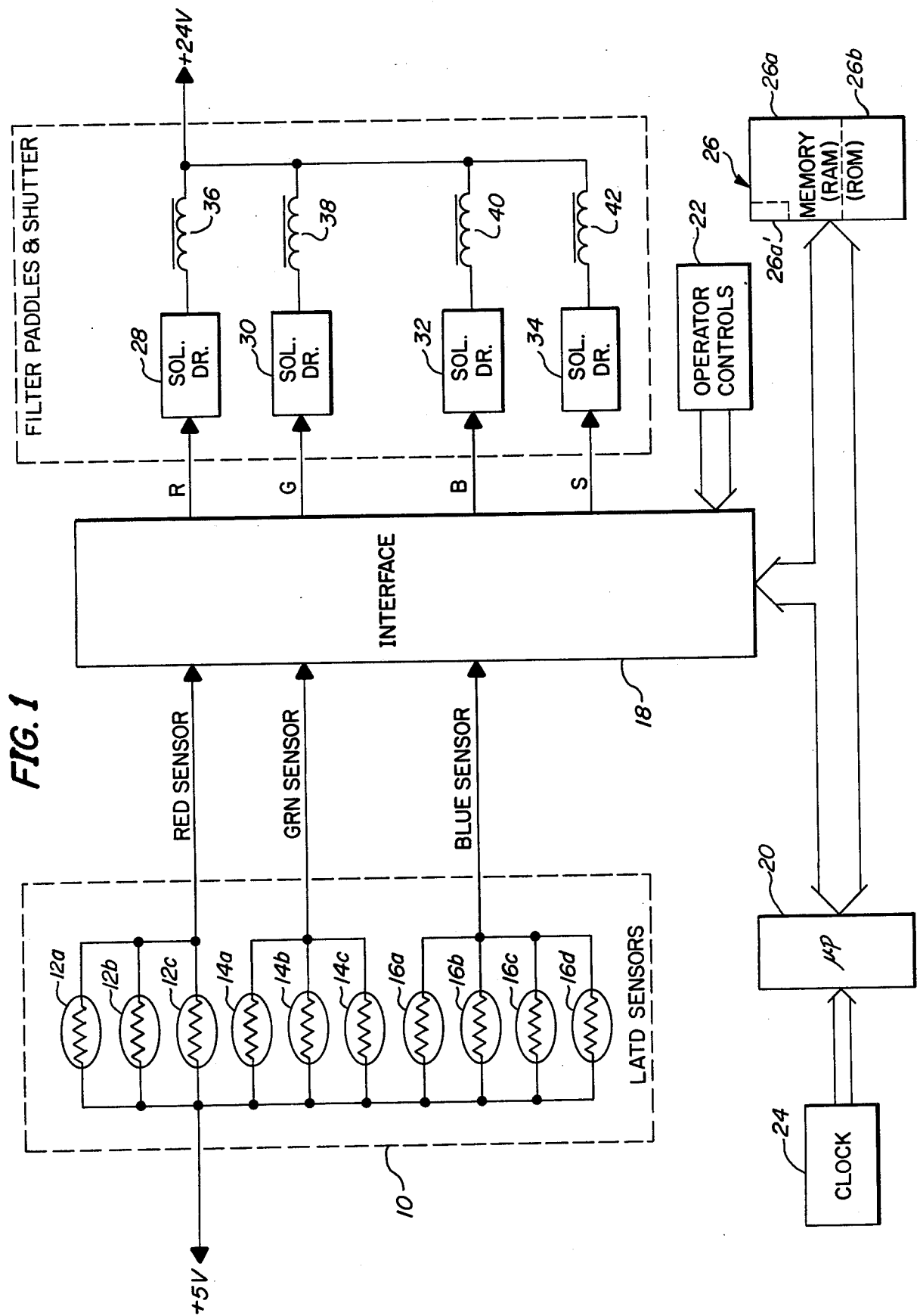
FIG. 1 is an electrical block diagram of an exposure control system for a photographic printer.

In FIG. 1, a block diagram of an exposure control system for a subtractive type photographic printer is shown. The printer is of the type having large area transmission density (LATD) sensors 10 which sense light from a negative which is to be printed. In one preferred embodiment, LATD sensors 10 are mounted in a ring positioned between the negative and the focusing optics of the photographic printer, such as shown in U.S. Pat. No. 4,125,326 which is assigned to the same assignee as the present application. In the embodiment shown in FIG. 1, LATD sensors 10 include three red sensitive sensors 12a, 12b and 12c which produce a RED SENSOR signal; three green sensitive sensors 14a, 14b and 14c which produce a GREEN SENSOR signal; and four blue sensitive sensors 16a, 16b, 16c and 16d which produce a BLUE SENSOR signal.

The RED SENSOR, GREEN SENSOR and BLUE SENSOR signals are supplied through interface circuitry 18 to microprocessor 20. Also supplied to microprocessor 20 are operator control signals produced by operator controls 22. These operator control signals may include, for example, color or density button corrections desired by the operator for a particular print, and may also include control settings for selecting a particular color balance set-up.

Clock 24 supplies clock signals to microprocessor 20. Memory 26 preferably includes both random access read/write memory (RAM 26a) and read only memory (ROM 26b) which are used by microprocessor 20 in controlling operation of the exposure control system.

In a preferred embodiment of the present invention, memory 26 contains color balance setup information for a plurality of different color balance setups representing different combinations of film type, film size, and print paper size. Operator controls 22 include means such as a thumbwheel switch for selecting one of the plurality of color balance setups which is stored in memory 26. The selected or "active" color balance setup is loaded into an Active Setup Buffer (designated 26a' in FIG. 1) which is a predetermined set of locations within the RAM 26a of memory 26. The color balance setup information which is loaded into the Active Setup Buffer 26a' includes in one successful embodiment, the following: log intensities and log times for a normal or reference negative, and over and under slopes. In addition to the setup information, the Active Setup Buffer 26a' also contains current correction values, sensor readings (i.e. log intensities for the negative then being printed), and the results of the exposure calculations.

In the exposure control system shown in FIG. 1, microprocessor 20 supplies control signals through interface circuitry 18 to solenoid drivers 28, 30, 32 and 34 which drive red filter paddle solenoid 36, green filter paddle solenoid 38, blue filter paddle solenoid 40 and shutter solenoid 42, respectively. Solenoids 36, 38, 40 and 42 control the position of the filter paddles and the shutter in the optical path of the printer, and thereby controlling the exposure of the photographic print paper in each of the three color channels (i.e. red, green and blue).

In the present invention, LATD sensors 10 operate in two distinctly different modes prior to and during an exposure cycle. Prior to the start of an exposure, solenoid 42 is de-energized and the shutter is in place in the optical path so that no light reaches the photographic print paper. Microprocessor 20 provides signals to interface 18 to initialize the readings of the red, green and blue LATD sensor, and initial readings for all three sensor signals are taken. As each sensor reading is completed, signals are provided to microprocessor 20, which calculates logarithmic values and stores the logarithmic values in Active Setup Buffer 26a'.

When all three sensor readings are completed, all three exposure times are calculated based upon the information stored in Active Setup Buffer 26a', which includes the three logarithmic values, current correction values (based upon any color or density button correction received from the operator control 22) and the setup information for the selected color balance setup. The calculation of the three exposure times must await the completion of all three sensor readings because sensor readings for all three colors must be available to calculate any one of the exposure times.

Once the three exposure times have been calculated, microprocessor 20 stores a red, a green and a blue exposure time in the active setup buffer in both a $\log_2$ and a two's complement form. The two's complement exposure times are called the set point count for the red, green and blue color channels. Exposures are timed by microprocessor 20, which increments a counter (which is preferably a memory location within memory 26) each time a real time clock signal is received. When the count in the counter equals one of the set point counts, the exposure for that particular color channel is terminated by microprocessor 20.

In one preferred embodiment, interface 18 includes a real time clock circuit which provides the real time clock signal at one of four different frequencies. This real time clock circuit will be described later in further detail in conjunction with FIG. 4. The four real time clock frequencies permit the total range of exposure times to be divided up into four subranges in order to provide the desired time and accuracy. Microprocessor 20 selects a scale factor representing the desired clock range as well as the desired count range of the set point counts stored in the active setup buffer.

After calculation of the initial set point counts and selection of the real time clock frequency, microprocessor 20 initiates an exposure cycle by supplying a signal to solenoid driver 34 which causes the shutter to be driven out of the light path. Once the exposure cycle is started, microprocessor 20 also enables the LATD signal processing circuitry within interface 18, and LATD sensors 10 enter their second mode of operation. In this mode LATD sensors 10 run asynchronously in parallel with the exposure time for the duration of the exposure. Each time one of the LATD sensors has completed a reading, the sensor data is supplied to microprocessor 20, which recalculates the exposure time for that particular color channel. The recalculated exposure time is based upon the newly received sensor reading and upon the previously stored running average sensor readings for the other two color channels. Based upon the recalculated exposure time, microprocessor 20 modifies the appropriate set point count contained in Active Setup Buffer 26a'. In this manner, the exposure times are continuously corrected throughout the exposure cycle by the LATD sensor readings taken during the exposure cycle.

The exposure time for each channel is controlled by microprocessor 20. Each time a real time clock signal is received, microprocessor 20 is interrupted, and increments the time count stored in RAM 26a. When, for example, the time count plus the red set point count equals 10000 H, microprocessor 20 supplies a drive signal through interface circuitry 18 to solenoid driver 28 to energize solenoid 36 to drive the red filter paddle into light path and terminate the exposure in the red color channel. The time count continues to be incremented until all three exposure times have been completed. When the third and last color channel completes its timing, microprocessor 20 drives the shutter into the light path.

In a preferred embodiment of the present invention the raw sensor data from LATD sensors 10 is conditioned by microprocessor 20 prior to being used in calculation of exposure times. This provides greater accuracy in the resultant exposure time.

There are two phases to the conditioning of the raw sensor data by microprocessor 20. First, bad data points are sorted out and are not used in controlling exposures. Second, microprocessor 20 maintains running averages of the red, green and blue sensor data.

A bad data point is defined as one for which a sensor value is less than a predetermined numerical value. If a bad data point occurs during the first mode of operation (prior to initiation of the exposure), the sensor which produced the bad data point is restarted by microprocessor 20 and a second reading is taken. If the second reading once again is a bad data point, microprocessor 20 terminates the exposure cycle without ever starting the exposure.

During an exposure, microprocessor 20 ignores bad data points and does not change the running average of sensor readings if a bad data point occurs. However, if two consecutive errors occur in a particular color channel, (i.e. two consecutive readings from the same sensor are determined to be bad data points) microprocessor 20 will terminate the exposure. Similarly, if a total of "n" bad data points occur during an exposure cycle, microprocessor 20 will terminate the exposure. In a preferred embodiment, the number "n" varies as a function of exposure time, so that a greater number of errors are permitted as the exposure time increases.

In one preferred embodiment the running average taken by microprocessor 20 is a weighted average which places greater weight on the most recent sensor reading. One particularly simple yet effective method of providing a running average which has been used successfully in the present invention is as follows:

Let B(N) denote the log of the Nth Sensor value and A(N) the running average at the Nth Sensor reading. Then:

$$A(0) = B(0)$$

and $$A(N) = A(N-1) + 2^{-M}[B(N) - A(N-1)]$$

where $0 \leq M \leq 7$, M an integer

The running averages are kept for each of the three colors, and are stored in Active Setup Buffer 26a'.

When a new sensor reading is received for one of the three colors, the raw sensor data is collected by microprocessor 20 and is converted to a two byte logarithm. This logarithmic value is then used to update the running average for that color in Active Setup Buffer 26a'. Microprocessor 20 then recalculates the exposure time for that color and generates a new log$_2$ exposure time as well as a new normalized TWO's complement set point count. If the exposure channel is still timing, the new count is used to update the exposure set point count.

Figure 2:
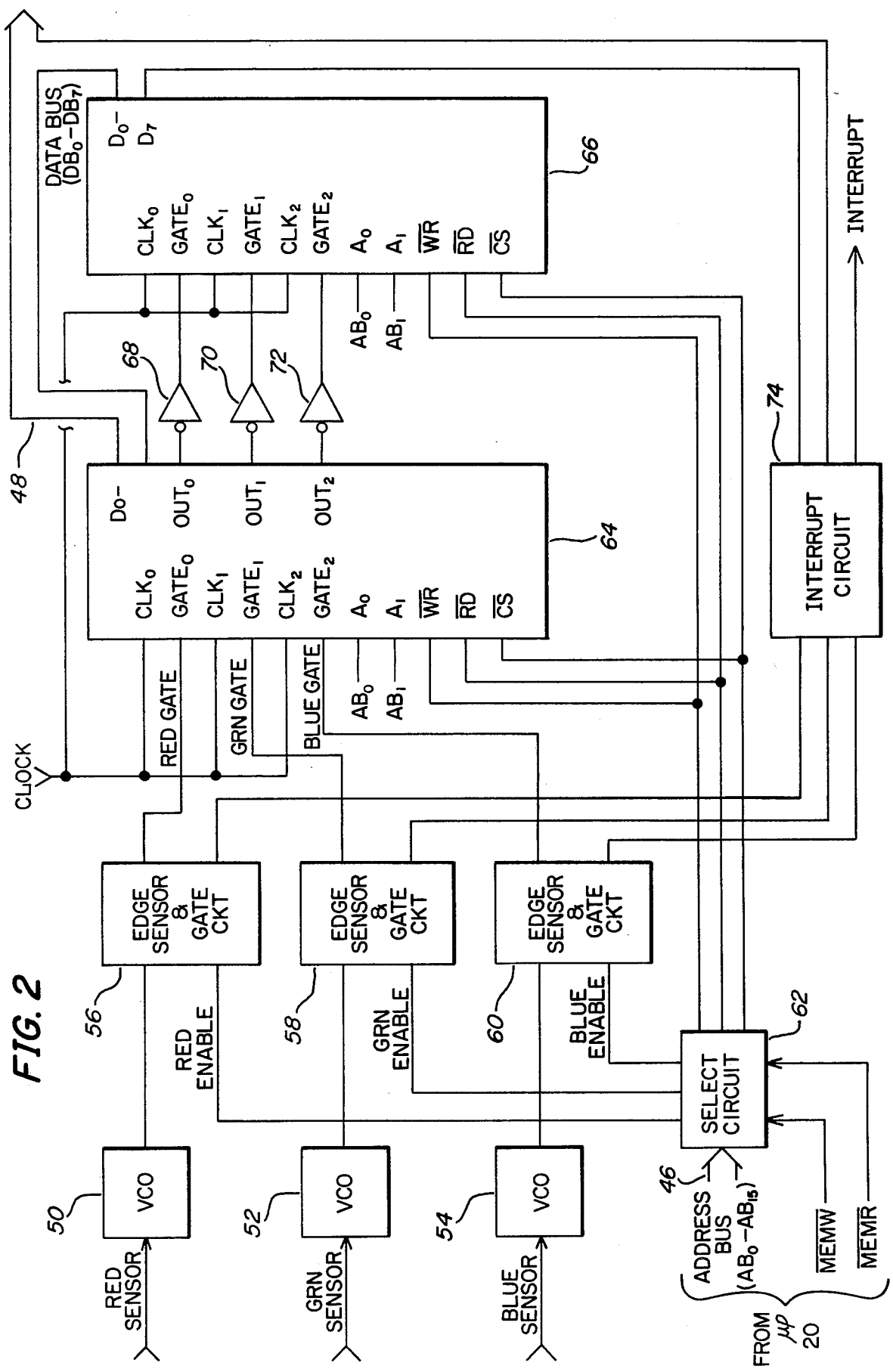
FIG. 2 is an electrical block diagram showing a preferred embodiment of a portion of the interface circuitry of the exposure control system of FIG. 1.

FIG. 2 shows a block diagram of a portion of interface circuit 18 which provides the raw sensor data in digital form to microprocessor 20. Control signals are received from microprocessor 20 through address buss 46 and $\overline{\text{MEMW}}$ $\overline{\text{MEMR}}$ lines, and sensor data is supplied to microprocessor 20 over data buss 48.

The RED SENSOR, GREEN SENSOR and BLUE SENSOR signals from LATD sensors 10 are supplied to voltage controlled oscillators (VOCs) 50, 52 and 54, respectively. The output of VCO 50 is a pulse output signal whose duration is a function of the RED SENSOR signal, and therefore the light which is sensed by LATD red sensors 12a, 12b and 12c. As the red light intensity increases, the pulse width of the output pulse from FCO 50 decreases. Similarly, as the red light intensity decreases, the pulse width from VCO 50 increases. Similarly, VCO 50 supplies output pulses representative of the GREEN SENSOR signal, and VCO 54 supplies output pulses whose pulse width is a function of the BLUE SENSOR signal.

The outputs of VCOs 50, 52 and 54 are supplied to edge sensor and gate circuits 56, 58 and 60, respectively. These circuits also receive ENABLE signals from microprocessor 20 through select circuit 62. The output of edge sensor and gate circuits 56, 58 and 60 are a RED GATE signal, a GREEN GATE signal, and a BLUE GATE signal and are supplied to counter circuitry formed by counters 64 and 66 and inverters 68, 70 and 72. In one preferred embodiment, counters 64 and 66 are Intel 8253 programmable interval timer/counter integrated circuits. In this embodiment counters 64 and 66 are each organized as three independent sixteen-bit counters. The outputs OUT$_0$ OUT$_1$ and OUT$_2$ from least significant bit counter 64 are supplied to the GATE$_0$, GATE$_1$ and GATE$_2$ inputs, respectively, of most significant bit counter 66. The counter circuitry, therefore, acts as three independent thirty-two bit counters, one for the red color channel, one for the green color channel, and one for the blue color channel.

CLOCK signals are supplied to the Clock inputs of counters 64 and 66. These CLOCK signals have a much higher frequency than the pulse output of VCOs 50, 52, and 54.

Microprocessor 20 supplies signals to select circuit 62, which in turn provides the appropriate RED, GREEN or BLUE ENABLE signals. As described previously, in the first phase of operation prior to initiation of an exposure, sensors for all three colors are enabled at the same time. After initiation of the exposure and and throughout the duration of the exposure the sensors are again enabled and operate asynchronously on a rotating priority basis which will be described later.

For the purposes of illustration, the operation of the circuit shown in FIG. 2 will be described with reference to the red color channel. It should be understood, however, that the operation in the green and blue color channels is identical. When the RED ENABLE signal is received by edge sensor 56 and when the output of voltage control oscillator 50 first goes high, the RED GATE signal also goes high, thereby enabling the thirty-two bit red channel counter within counters 64 and 66. The red counter begins to count at a rate determined by the fixed frequency CLOCK signal supplied to the CLK$_0$ input. The red count continues to increase until the output of VCO 50 goes low. The change of state of the output of VCO 50 causes the RED GATE signal to go low, thereby terminating the red count. It can be seen, therefore, that the magnitude of the red count is an indication of the duration of the output pulse of VCO 50. The longer the pulse width of the RED GATE signal pulse from VCO 50, the higher the red count, and conversely the shorter the pulse width of the RED GATE signal pulse, the lower the red count contained in counters 64 and 66. As discussed previously, the pulse width from VCO 50 is a function of the RED SENSOR signal, and therefore the intensity of the light sensed by red LATD sensors 12a, 12b, and 12c. As the light intensity increases, the pulse width of the RED GATE signal from VCO 50 decreases, and therefore the red count in counters 64 and 66 will be reduced. Similarly, a decrease in light sensed by sensors 12a, 12b, and 12c results in a RED GATE signal pulse from VCO 50 of longer duration, which in turn results in a larger red count in counters 64 and 66.

When the RED GATE signal goes low, edge sensor and gate circuit 56 also supplies a signal to interrupt circuit 74, which supplies an INTERRUPT signal to microprocessor 20, and which also supplies information over data buss 48 indicating which of the three color channels has completed a reading. Microprocessor 20 then interrogates the counters 64 and 66 through select circuitry 62 and receives the thirty-two bit red count in eight-bit bytes. In addition, microprocessor 20 terminates the RED ENABLE signal which has been supplied to edge sensor and gate circuit 56.

Since the time required to produce the red, green and blue counts will differ in nearly all cases, the times at which microprocessor 20 receives INTERRUPT signals for the three sensor readings will also differ. During the initial mode of operation prior to initiation of an exposure, all three channels are enabled at the same time. As each channel completes its count, interrupt circuit 74 signals microprocessor 20, which retrieves the appropriate count (i.e. the "raw sensor data") from counters 64 and 66 for that color channel. This data is converted to a two-byte logarithmic value and is stored until all sensor readings for all three colors have been completed. When the final count has been completed and the raw sensor data is received by microprocessor 20, all three exposure times are calculated. As discussed previously, the exposure set point counts initially calculated are used at the initiation of the exposure, and are modified during the course of the exposure as new red, green, and blue counts are completed in counters 64 and 66 and new INTERRUPT signals are supplied by interrupt circuit 74.

When the exposure is initiated, microprocessor 20 again enables the LATD sensors for all three color channels. As the output of each VCO 50, 52 and 54 goes high, the RED GATE, GREEN GATE, and BLUE GATE signals go high and the red, green and blue counters begin counting in response to the high frequency CLOCK signal supplied at the $CLK_0$, $CLK_1$ and $CLK_2$ inputs of counters 64 and 66. Since the intensities of the red, green and blue light sensed by LATD sensors 12a–12c, 14a–14c and 16a–16d usually will be different, the pulse widths of the RED GATE, GREEN GATE, and BLUE GATE signal pulses of VCOs 50, 52 and 54 will also be different. The RED GATE, GREEN GATE and BLUE GATE signals, therefore, will end at different times. In one preferred embodiment, the sensors are re-enabled on a rotating priority basis so that all three color channels will receive updated sensor readings. In this embodiment the blue sensors are re-enabled after each blue interrupt because the blue sensors are the slowest, i.e. they take the longest time to complete a blue count. After each red interrupt, the GREEN ENABLE signal is supplied so that a GREEN GATE signal is produced and a green count is generated. During this time period, the red sensors are in effect inactive, since the RED ENABLE signal is not supplied to edge sensor and gate circuit 56, and the RED GATE signal is low. Similarly, after a green interrupt, the RED ENABLE signal is provided and the GREEN ENABLE signal remains low, thereby causing the GREEN GATE signal to remain low. This rotating priority avoids the possibility of lock-out of the blue sensors which have the lowest number of interrupts.

When one of the color channels times out, the rotating priority is modified. For example, if the red channel times out first, the green channel will thereafter be re-enabled after each green interrupt. The readings of the sensors continue until the exposure is completed for their respective color channels. The number of readings which are taken during exposure for each channel will depend, of course, on the length of the exposure time in that particular color channel. Typically, about ten to thirty additional sensor readings for each color channel are made during an exposure. The use of additional sensor readings significantly increases the accuracy of the exposure times which are calculated, since a weighted average of all readings is taken and individual bad data points are eliminated. Since the additional sensor readings are taken during rather than before initiation of an exposure, the present invention minimizes time delays prior to initiation of exposures while providing improved accuracy of sensor readings and exposure times.

Figure 3:
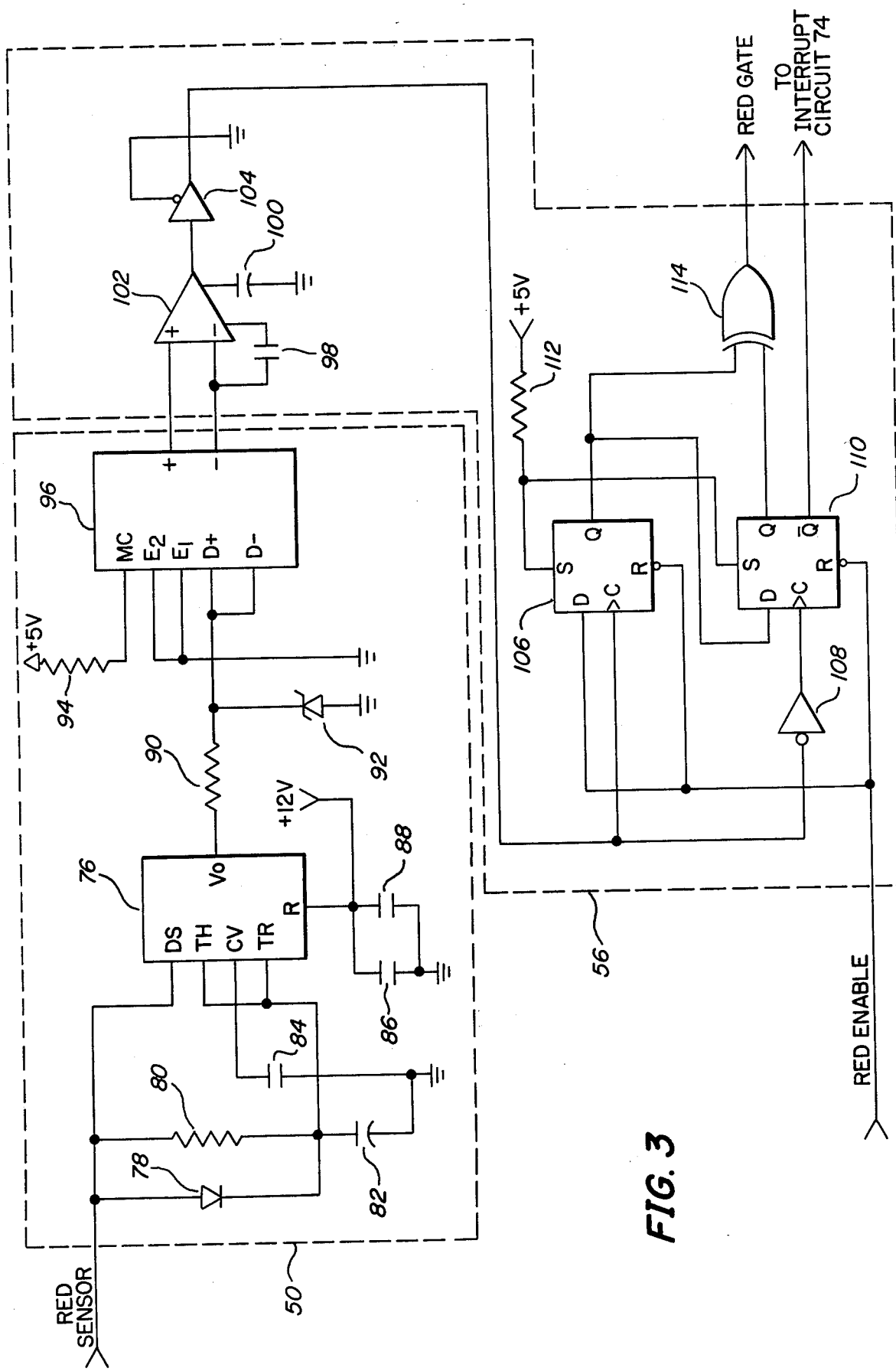
FIG. 3 is an electrical schematic diagram showing the voltage controlled oscillator, edge sensor and gate circuitry of a preferred embodiment of the circuitry shown in FIG. 2.

FIG. 3 shows an electrical schematic diagram of VCO 50 and edge sensor and gate circuit 56. VCOs 52 and 54 are similar to VCO 50, and edge sensor and gate circuits 58 and 60 are similar to circuit 56. The circuits shown in FIG. 3, therefore, are also representative of the green and blue color channels, as well as the circuitry found in the red color channel.

The RED SENSOR signal received from red LATD sensors 12a, 12b and 12c is a current which is supplied to VCO 50, which is formed by 555-type integrated circuit timer 76, diode 78, resistor 80, and capacitors 82, 84, 86 and 88. The RED SENSOR signal is supplied to the discharge (DS) input of timer 76. In addition, the RED SENSOR signal charges capacitor 82 through diode 78. The junction of capacitor 82 and resistor 80 is connected to both the threshold (TH) and the trigger (TR) inputs of timer 76. When the voltage at the threshold and trigger inputs reaches a predetermined level, the output ($V_0$) of timer 76 goes low and capacitor 82 is discharged. Once capacitor 82 has been discharged, the output of timer 76 again goes high and capacitor 82 again begins charging through diode 78.

The output of timer 76, therefore, is a pulse signal which goes high for a duration which is determined by the time required to charge capacitor 82 to the threshold voltage. The output then goes low for a brief period while capacitor 82 is discharged and then again goes to high to begin another output pulse. The duration of the high output from timer 76, therefore, is a function of the RED SENSOR signal, which in turn is determined by the intensity of light received by red sensors 12, 12b and 12c. An increase in the intensity of the light received results in a larger RED SENSOR signal current, which causes capacitor 82 to be charged at a faster rate, and the duration of the high output pulse from timer 76 to decrease. Conversely, a decrease in light intensity received results in a decrease in the RED SENSOR signal current and an increase in the charging time of capacitor 82. This results in a longer high output pulse from timer 76.

The output of timer 76 is supplied to a driver circuit including resistor 90, Zener diode 92, resistor 94, and integrated circuit driver 96. The output of driver 96 is supplied to edge sensor and gate circuit 56.

The "+" and "−" outputs from driver circuit 96 are received by an amplifier circuit including capacitors 98 and 100 and comparator 102. The output of comparator 102 is buffered by gate 104 and supplied to a Clock input of flipflop 106 and through inverter 108 to a Clock input of flipflop 110. The RED ENABLE signal is supplied to the Reset inputs of both flipflop 106 and flipflop 108, and also is supplied to the D input of flipflop 106. Pull-up resistor 112 is connected between the S inputs of flip-flops 106 and 110 and a +5 volt power supply to establish the proper voltage levels at the S inputs. The Q output of flipflop 106 is supplied to the D input of flipflop 110 and to one input of exclusive OR gate 114. The Q output of flipflop 110 is the other input to exclusive OR gate 114, and the $\overline{Q}$ output of flipflop 110 is supplied to interrupt circuit 74 (shown in FIG. 2). The output of exclusive OR gate 114 is the RED GATE signal which is supplied to counter 64 (shown in FIG. 2).

The RED ENABLE signal is normally low, and goes high when microprocessor 20 wishes to enable the red sensor circuit to produce a red sensor reading. A low RED ENABLE signal holds both flipflop 106 and flipflop 110 in a reset state with the Q outputs low. In this state, therefore, the RED GATE signal is low, and no counting of the red counters within counters 64 and 66 can take place. In addition, when the RED ENABLE signal is low, no interrupt from the red channel is allowed.

When the RED ENABLE signal goes high, it removes the resets from flipflops 106 and 110. In addition, it applies a high input to the D input of flipflop 106. The next time that the output of timer 76 goes high, thereby causing the output of comparator 102 to go from low to high, flipflop 106 is clocked, and due to the high state of the RED ENABLE signal at the D input, the Q output of flipflop 106 goes high. Since the Q output of flipflop 110 remains low, the output of exclusive OR gate 114 (i.e. the RED GATE signal) goes high. This enables counters 64 and 66 containing the red count to begin counting in response to the CLOCK signals.

The RED GATE signal remains high and the counters continue to count as long as the Q output of flipflop 110 remains low while the Q output of flipflop 106 is high. When the output of timer 76 goes low, the output of comparator 102 goes low, thereby causing the Clock input of flipflop 110 to go from low to high. Since the Q output of flipflop 106 (which is high) is being applied to the D input of flipflop 110, the Q output of flipflop 110 goes high. This causes the RED GATE signal to go low, thereby completing the red count within counters 64 and 66.

As stated above, the $\overline{Q}$ output of flipflop 110 is supplied to interrupt circuit 74. An INTERRUPT signal is then supplied to microprocessor 20. Microprocessor 20 interrogates interrupt circuit 74 to determine which sensor produced the interrupt, receives the red count from counters 64 and 66, and causes the RED ENABLE signal to go low. Further sensor readings in the red channel will be inhibited until the RED ENABLE signal again goes high. As described previously, a rotating priority system preferably is used between the three sensor circuits so that each color channel has approximately the same number of additional sensor readings made. The circuit shown in FIG. 3 permits microprocessor 20 to enable the sensors selectively to achieve this rotating priority.

Figure 4:
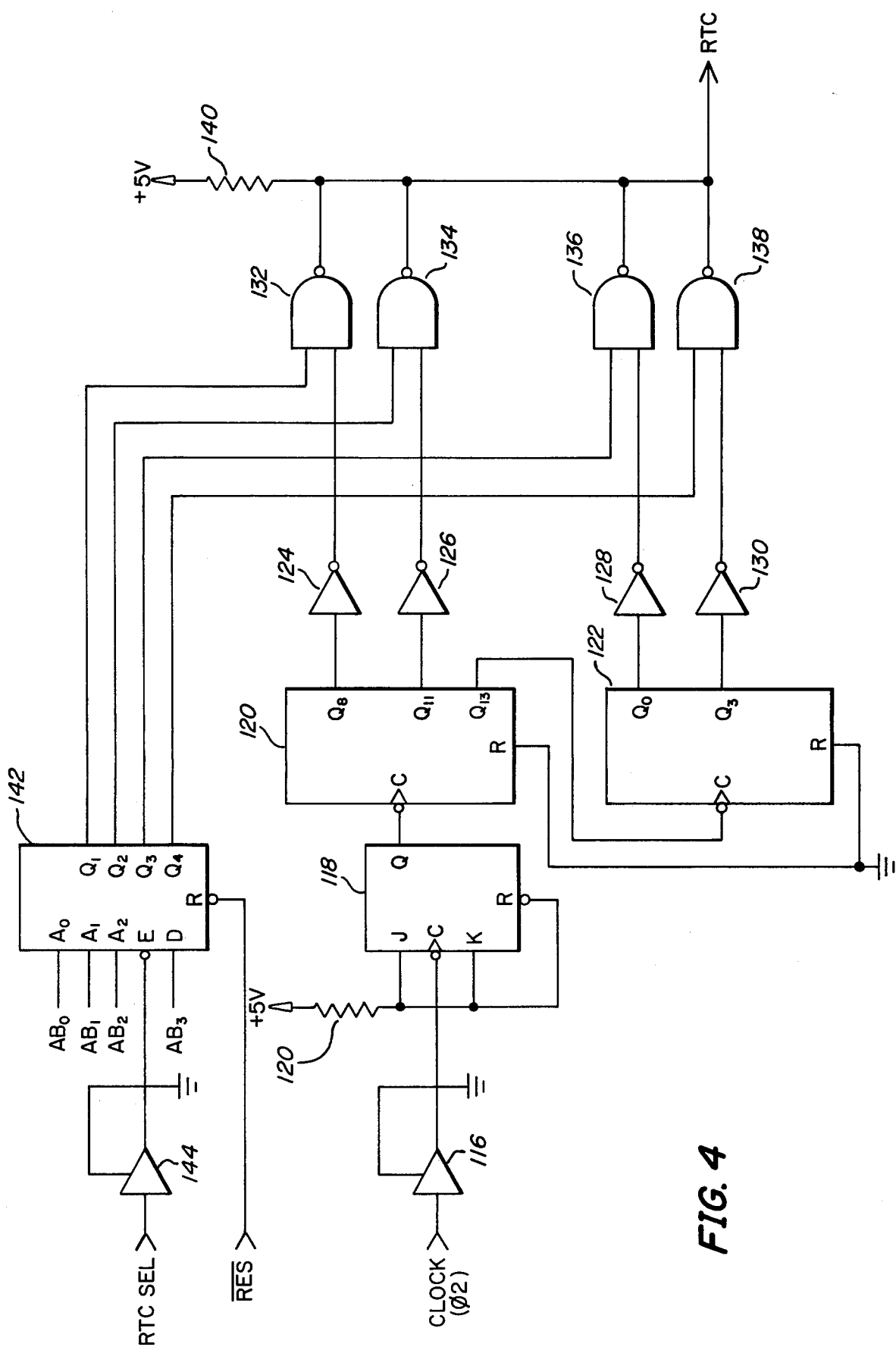
FIG. 4 is an electrical block diagram showing a portion of the interface circuitry of the exposure control system of FIG. 1 which includes a real time clock circuit used in exposure timing.

FIG. 4 shows another portion of interface circuitry 18. This portion shown in FIG. 4 produces the REAL TIME CLOCK signal which has one of four selective frequencies. The inputs of the circuitry shown in FIG. 4 includes lines AB0, AB1, AB2 and AB3 of the address bus, the RTC select signal, a reset ($\overline{RES}$) signal, and the clock signal ($\phi 2$) which is produced by clock 24. The output of this circuit is the REAL TIME CLOCK (RTC) frequency signal.

In FIG. 4, the $\phi 2$ clock signal is buffered by gate 116 and is supplied to the clock input of flipflop 118. The J, K and R inputs of flipflop 18 are all connected through pullup resistor 120 to a +5 volt power supply. The Q output of flipflop 118 is supplied to the Clock input of counter 120. The Q13 output of counter 120 is connected to the clock input of counter 122, so that counters 120 and 122 are cascaded. As shown in FIG. 4, the $Q_8$ and $Q_{11}$ outputs of counter 120 and the $Q_0$ and $Q_3$ outputs of counter 122 are the four outputs of the cascaded counters. Counters 120 and 122, therefore, divide the frequency of the $\phi 2$ clock signal to four different REAL TIME CLOCK frequencies.

The outputs of counters 120 and 122 are inverted by inverters 124, 126, 128, and 130 and are supplied to inputs of NAND gates 132, 134, 136 and 138, respectively. The outputs of NAND gates 132, 134, 136 and 138 are tied together and are tied through pullup resistor 140 to a +5 volt supply. The common output of the NAND gates is the RTC signal which is supplied to microprocessor 20 as an interrupt signal.

The selection of one of the four frequencies supplied through inverters 124, 126, 128 and 130 made by microprocessor 20 through select circuit 142. The AB0, AB1, AB2 and AB3 lines of address bus 46 are supplied to inputs of select circuit 142. In addition, an RTC SELECT signal is supplied through buffer 144 to the Enable input of select circuit 142. The $\overline{RES}$ signal is also supplied to the Reset terminal of select circuit 142. When microprocessor 120 supplies an RTC SELECT signal which enables select circuit 142, one output of select circuit 142 (either Q1, Q2, Q3 or Q4) goes high. The particular output which goes high depends upon the state of address lines AB0-AB3. Outputs Q1-Q4 of select circuit 142 are connected to NAND gates 132, 134, 136 and 138, respectively. The particular output which is high permits the selected output of counters 120 and 122 to pass through the NAND gate and be supplied as the RTC signal. For example, if output Q1 of select circuit 142 is high, the Q8 output of counter 120 which is supplied through inverter 124 is supplied through NAND gate 132 to become the RTC signal. Since outputs Q1-Q4 are low, the outputs of NAND gates 134, 136 and 138 all remain high regardless of the signals from counters 120 and 122.

It can be seen, therefore, that the real time clock select circuit shown in FIG. 4 divides the high frequency $\phi 2$ clock signal into four lower frequencies and selects, under the control of microprocessor 20, one of the four frequencies as the RTC signal. As discussed previously, the RTC signal interrupts microprocessor 20 and causes microprocessor 120 to increment the exposure count contained in the Active Setup Buffer 26a'. Microprocessor 20 compares the exposure count with the set point counts to determine when each color channel has completed its exposure. The selected RTC signal frequency at which the exposure count is incremented together with the set point counts for each color channel, determine the exposure times for the three color channels.

In conclusion, the exposure time control of the present invention provides accurate exposure timing for a wide range of possible exposure times. Improved accuracy is achieved by obtaining LATD sensor readings both prior to and during exposure of the photographic print paper. Bad data points are sorted out, and a weighted running average of sensor readings is used to recalculate exposure times during the course of the exposure. The present invention, therefore, makes effective use of the computing power of microprocessor 20 to improve the accuracy of sensor readings, and therefore the accuracy of exposure times based upon those readings, without introducing significant delays prior to initiation of each exposure.

Although the present invention has been described with reference to preferred embodiments, workers skilled in the art will recognize that changes may be made in form and detail without departing from the spirit and scope of the invention.

What is claimed is:

1. A method of controlling red, green and blue exposure time in a photographic printer based upon red, green and blue large area transmission density (LATD) sensor readings, the method comprising:
   making red, green and blue LATD sensor readings prior to initiation of an exposure cycle;
   calculating red, green, and blue initial exposure times based upon the LATD sensor readings;
   initiating an exposure cycle;
   making LATD sensor readings during the exposure cycle; and
   modifying red, green and blue exposure times during the exposure cycle as a function of the LATD sensor readings made during the exposure cycle.

2. The method of claim 1 and further comprising:
   making running averages of the red, green, and blue LATD sensor readings during the exposure time cycle.

3. The method of claim 2 wherein modifying the exposure times is based upon the running averages of the red, green, and blue LATD sensor values.

4. The method of claim 3 wherein the running averages are weighted averages of the LATD sensor readings.

5. The method of claim 4 wherein the weighted average places greater weight upon the most recent LATD sensor reading.

6. The method of claim 1 and further comprising eliminating, when calculating initial or modified exposure times, LATD sensor readings falling outside a predetermined range.

7. The method of claim 6 and further comprising:
   terminating an exposure cycle if a predetermined number of consecutive LATD sensor readings in one color channel fall outside the predetermined range.

8. The method of claim 7 and further comprising:
   terminating an exposure cycle if a predetermined total number of LATD sensor readings fall outside the predetermined range.

9. The method of claim 1 wherein calculating red, green and blue initial exposure times comprises:
   converting the LATD sensor readings to logarithmic values; and
   calculating red, green and blue initial exposure times as a function of the logarithmic values.

10. The method of claim 9 wherein modifying exposure times during the exposure cycle comprises:
    providing logarithmic values of the LATD sensor readings;
    providing running averages of the logarithmic values; and
    recalculating exposure times based upon the running averages of the logarithmic values.

11. The method of claim 1 wherein the LATD sensor readings during the exposure cycle are made asynchronously.

12. The method of claim 11 wherein the LATD sensors provide red, green, and blue interrupt signals when each LATD sensor reading is completed.

13. The method of claim 12 wherein the blue LATD sensor is restarted after each blue interrupt signal; the green LATD sensor is started after each red interrupt signal and the red LATD sensor is left inactive; and the red LATD sensor is started after each green interrupt signal and the green LATD sensor is left inactive, until one of the exposure times is completed.

14. A method of controlling red, green and blue exposure times in a photograhpic printer based upon red, green and blue large area transmission density (LATD) sensor readings, the method comprising:
    making a plurality of red, green and blue LATD sensor readings during an exposure cycle;
    calculating average red, green and blue sensor readings based upon the plurality of readings; and
    controlling red, green and blue exposure times as a function of the average red, green and blue sensor readings.

15. The method of claim 14 wherein the average red, green and blue sensor readings are weighted averages.

16. The method of claim 14 and further comprising eliminating, when calculating average red, green and blue sensor readings, any LATD sensor reading falling outside a predetermined range.

17. The method of claim 16 and further comprising:
    terminating an exposure cycle if a predetermined number of consecutive LATD sensor readings in one color channel fall outside the predetermined range.

18. The method of claim 17 and further comprising:
    terminating an exposure cycle if a predetermined total number of LATD sensor readings fall outside the predetermined range.

* * * * *